United States Patent
Yip et al.

(10) Patent No.: US 12,255,960 B2
(45) Date of Patent: Mar. 18, 2025

(54) METHOD AND APPARATUS FOR PROVIDING MEDIA SERVICE

(71) Applicant: Samsung Electronics Co., Ltd., Gyeonggi-do (KR)

(72) Inventors: Eric Yip, Gyeonggi-do (KR); Hyunkoo Yang, Gyeonggi-do (KR); Jaeyeon Song, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/741,864

(22) Filed: May 11, 2022

(65) Prior Publication Data

US 2022/0368762 A1 Nov. 17, 2022

(30) Foreign Application Priority Data

May 11, 2021 (KR) ........................ 10-2021-0060899

(51) Int. Cl.
*H04L 67/131* (2022.01)
*H04L 67/141* (2022.01)
*H04N 21/44* (2011.01)

(52) U.S. Cl.
CPC .......... *H04L 67/131* (2022.05); *H04L 67/141* (2013.01); *H04N 21/44012* (2013.01)

(58) Field of Classification Search
None
See application file for complete search history.

(56) References Cited

U.S. PATENT DOCUMENTS

| 2018/0332211 | A1 | 11/2018 | Chaudhri et al. |
| 2019/0104326 | A1 | 4/2019 | Stockhammer et al. |
| 2019/0200063 | A1 | 6/2019 | Bae et al. |
| 2021/0049827 | A1 | 2/2021 | Lebaredian et al. |
| 2021/0092444 | A1* | 3/2021 | Ilola ..................... H04N 21/816 |
| 2021/0099773 | A1* | 4/2021 | Bouazizi .......... H04N 21/85406 |
| 2021/0392386 | A1* | 12/2021 | Hinds ................... H04L 65/762 |
| 2021/0409818 | A1* | 12/2021 | Bouazizi ................ H04N 21/84 |
| 2022/0028172 | A1 | 1/2022 | Yip et al. |
| 2022/0053224 | A1* | 2/2022 | Katsumata .............. G06F 3/013 |
| 2022/0309743 | A1* | 9/2022 | Harviainen .......... H04N 21/435 |
| 2023/0026014 | A1* | 1/2023 | Brandt ................. H04N 13/117 |

FOREIGN PATENT DOCUMENTS

| KR | 10-2022-0012658 | 2/2022 |
| WO | WO 2019/074313 | 4/2019 |

OTHER PUBLICATIONS

International Search Report dated Aug. 10, 2022 issued in counterpart application No. PCT/KR2022/006783, 9 pages.

(Continued)

*Primary Examiner* — Tonia L Dollinger
*Assistant Examiner* — Ishrat Rashid
(74) *Attorney, Agent, or Firm* — The Farrell Law Firm, P.C.

(57) ABSTRACT

The disclosure relates to a 5G or 6G communication system for supporting a higher data transmission rate. According to embodiment, the method includes receiving, from a server, an SD based on URL information obtained from an AR/MR application, processing the SD, configuring at least one media buffer pipeline for a media object of a scene, based on the processed SD, and establishing transport sessions for components of the media object.

8 Claims, 13 Drawing Sheets

(56) References Cited

OTHER PUBLICATIONS

Output Document, "Potential Improvement on ISO/IEC 23090-14 Scene Description for MPEG Media", ISO/IEC JTC 1/SC 29/WG 03, MPEG Systems, Apr. 2021, 55 pages.
European Search Report dated Jul. 26, 2024 issued in counterpart application No. 22807852.3-1206, 10 pages.
European Search Report dated Oct. 9, 2024 issued in counterpart application No. 22807852.3-1206, 10 pages.

* cited by examiner

METHOD AND APPARATUS FOR PROVIDING MEDIA SERVICE

CROSS-REFERENCE TO RELATED APPLICATION(S)

This application is based on and claims priority under 35 U.S.C. § 119(e) to Korean Application No. 10-2021-0060899, which was filed in the Korean Intellectual Property Office on May 11, 2021, the entire disclosure of which is incorporated herein by reference.

BACKGROUND

1. Field

The disclosure relates generally to providing media service, and more particularly, to a method and apparatus for supporting new media formats for at least one of virtual reality (VR), augmented reality (AR), or mixed reality (MR) service.

2. Description of the Related Art $5^{th}$ generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement $6^{th}$ generation (6G) mobile communication technologies (referred to as beyond 5G systems) in terahertz bands (e.g., 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple input multiple output (MIMO) for mitigating radio-wave path loss and increasing radio-wave transmission distances in mmWave, supporting numerologies (e.g., operating multiple subcarrier spacings) for efficiently utilizing mmWave resources and dynamic operation of slot formats, initial access technologies for supporting multi-beam transmission and broadbands, definition and operation of a bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step random access channel (RACH) for NR). There also has been ongoing standardization in system architecture/service regarding a 5G baseline architecture (e.g., service based architecture or service based interface) for combining network functions virtualization (NFV) and software-defined networking (SDN) technologies, and mobile edge computing (MEC) for receiving services based on UE positions.

As 5G mobile communication systems are commercialized, connected devices, the number of which have been exponentially increasing, will be connected to communication networks, and it is accordingly expected that enhanced functions and performance of 5G mobile communication systems and integrated operations of connected devices will be necessary. To this end, new research is scheduled in connection with extended reality (XR) for efficiently supporting AR, VR, MR and the like, 5G performance improvement and complexity reduction by utilizing artificial intelligence (AI) and machine learning (ML), AI service support, metaverse service support, and drone communication.

Furthermore, the development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

A big challenge in VR, AR and MR is the need to support new media formats for such services.

SUMMARY

An aspect of the disclosure is to provide methods and apparatuses for AR service flows and entry points. Due to the inconsistent bandwidth availability of the Internet and network conditions, legacy 2-dimensional (2D) video streaming services can be streamed using adaptation mechanisms in order to deliver media content that is pre-adjusted (adapted) to the current network condition.

Another aspect of the disclosure is to provide multiple embodiments for VR/AR/MR media streaming procedures. Such embodiments support the streaming volumetric media described below, in addition to the streaming of scene descriptions (SDs).

Another aspect of the disclosure is to provide embodiments that support the adaption of these media services on different levels (SD, manifests, media pipelines) using these procedures. Different context criteria are provided which may be used for SD (glTF item) select, (scene) manifest selection, and pipeline adaptation selection.

According to an embodiment, a method performed by a client is provided. The method includes receiving, from a server, a SD based on uniform resource locator (URL) information obtained from an AR/MR application; processing the SD; configuring at least one media buffer pipeline for a media object of a scene, based on the processed SD; and establishing transport sessions for components of the media object.

According to an embodiment, a method performed by a base station is provided. The method includes transmitting, to a client, a SD based on the URL information related with an AR/MR application; and establishing, with the client, transport sessions for components of the media object for the scene, wherein a media buffer pipeline for the object is configured at the client based on the SD.

According to an embodiment, a client is provided. The client includes a transceiver; and a processor coupled with the transceiver and configured to: receive, from a server, a SD based on URL information obtained from an AR/MR application, process the SD, configure at least one media buffer pipeline for a media object of a scene, based on the processed SD, and establish transport sessions for components of the media object.

According to an embodiment, a server is provided. The server includes a transceiver; and a processor coupled with the transceiver and configured to: transmit, to a client, an SD based on the URL information related with an AR/MR application; and establish, with the client, transport sessions for components of the media object for the scene, wherein a media buffer pipeline for the object is configured at the client based on the SD.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
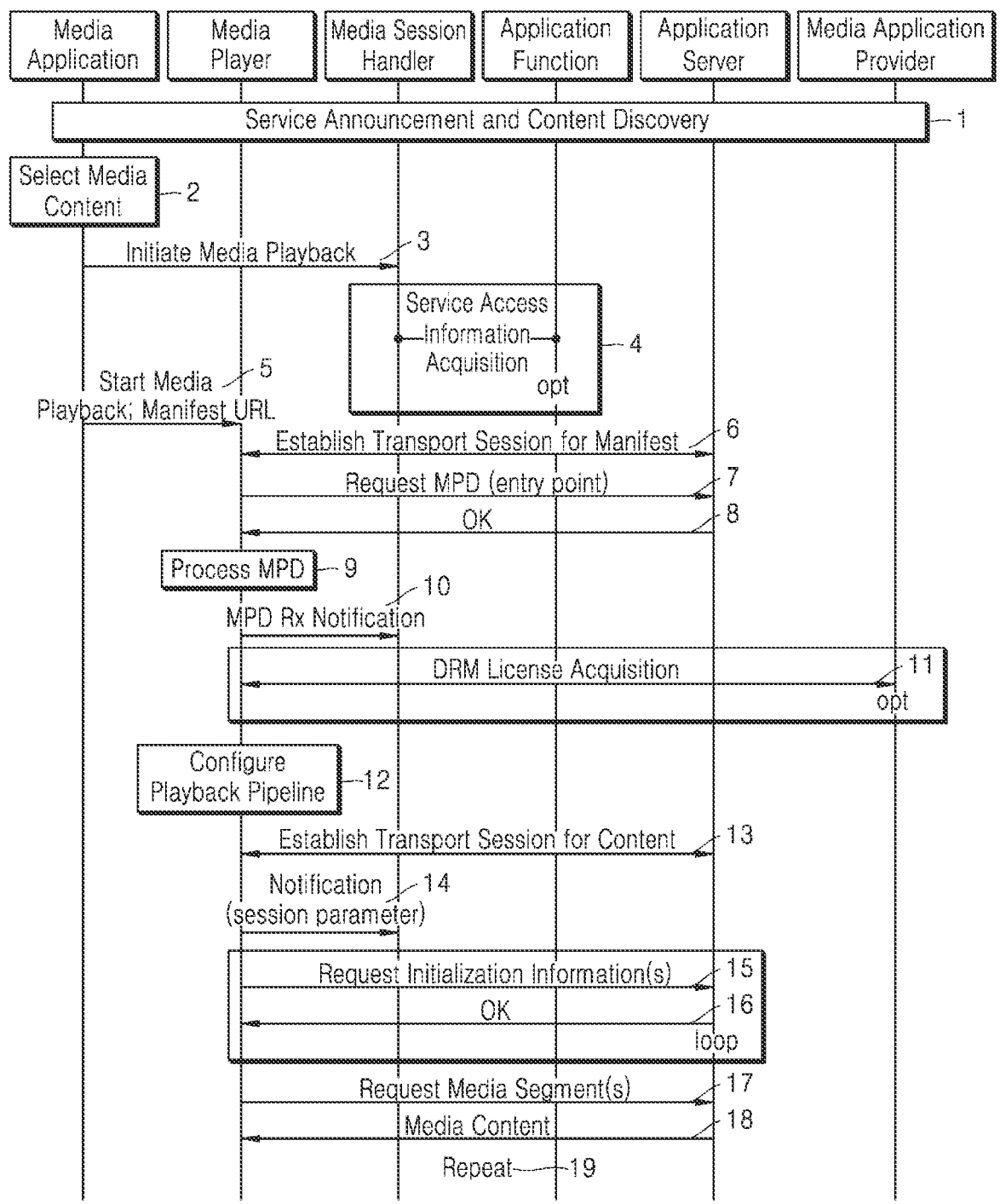
FIG. 1 is a flowchart illustrating a service procedure of a legacy video streaming service.

Throughout the disclosure, the expression "at least one of a, b or c" indicates only a, only b, only c, both a and b, both a and c, both b and c, all of a, b, and c, or variations thereof. Throughout the specification, a layer (or a layer apparatus) may also be referred to as an entity. Hereinafter, operation principles of the disclosure will be described in detail with reference to accompanying drawings. In the following descriptions, well-known functions or configurations are not described in detail because they would obscure the disclosure with unnecessary details.

The terms used in the specification are defined in consideration of functions used in the disclosure, and can be changed according to the intent or commonly used methods of users or operators. Accordingly, definitions of the terms are understood based on the entire descriptions of the present specification.

For the same reasons, in the drawings, some elements may be exaggerated, omitted, or roughly illustrated. Also, a size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements. It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s).

The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufactured items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" may refer to a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, in an embodiment of the disclosure, the "unit" may include at least one processor.

In the following descriptions of the disclosure, well-known functions or configurations are not described in detail because they would obscure the disclosure with unnecessary details.

Throughout the specification, function or an apparatus or a server for providing a media service may also be referred to as an entity.

Recent advances in multimedia include research and development into the capture of multimedia, the storage of such multimedia (formats), the compression of such multimedia (codecs etc.), as well as the presentation of such multimedia in the form of new devices which can provide users with more immersive multimedia experiences. With the pursuit of higher resolution for video, namely 8K resolution, and the display of such 8K video on ever larger television (TV) displays with immersive technologies such as high dynamic range (HDR), the focus in a lot of multimedia consumption has shifted to a more personalized experience using portable devices such as mobile smartphones and tablets. Another trending branch of immersive multimedia is VR, and AR. Such VR and AR multimedia typically requires the user to wear a corresponding VR or AR headset, or glasses (e.g. AR glasses), where the user's vision is surrounded by a virtual world, or where the user's vision and surroundings is augmented by multimedia which may or may not be localized into his/her surroundings such that they appear to be a part of the real world surroundings.

A big challenge in VR, AR and MR is the need to support new media formats for such services. Legacy 2D video is insufficient in providing immersive services such as VR, AR and MR. As such, volumetric media (formats) such as meshes, point clouds and other object based media formats are necessary in order to provide six degrees of freedom (6DoF) immersive media experiences. Such volumetric media can be either computer generated (e.g., similar to graphics), or may be captured from real objects/persons by different camera technologies and configurations (e.g., multiple cameras arranged such that a realistic volumetric point cloud can be created). Legacy 2D video typically consists of a single media bitstream (e.g., high efficiency video coding (HEVC) bitstream or advanced video coding (AVC) bitstream) which is fed into a decoder via a decoder buffer pipeline before it is decoded and rendered. For volumetric media, however, depending on the format used, one volumetric media object may require multiple media (or metadata) component bitstreams which are fed into different media buffer pipelines before they are processed into one renderable media object. Such an example is MPEG video based point cloud compression (V-PCC) contents, which consists of multiple components such as patch information, occupancy information, geometry information, texture (attribute) information, and other metadata information.

Apart from these individual volumetric media, unlike a legacy 2D video service, there are many scenarios where multiple volumetric media objects together create a whole VR/AR/MR experience. In this case, a descriptive format which can glue and compose the different volumetric media objects together is necessary. Such a descriptive format is a SD. A SD describes the scene in which both the user and the volumetric media (objects) are placed. Once a scene is composed, a user's view can then be rendered (as a 2D frame, via frustum culling) according to his/her device's pose (position and orientation).

In summary:

VR/AR/MR volumetric media have new characteristics compared to 2D video, namely:

A volumetric media object may consist of multiple bitstreams requiring multiple pipelines A VR/AR/MR service may include multiple volumetric media objects which require a SD Regarding the characteristics of such VR/AR/MR services in relation to 5G, streaming volumetric media requires huge bandwidth, due to the inherent 3D nature of volumetric media, and also due to the 6 degrees of freedom available to the user for VR/AR/MR services (vs. 1DoF of 2D video).

Figure 5:
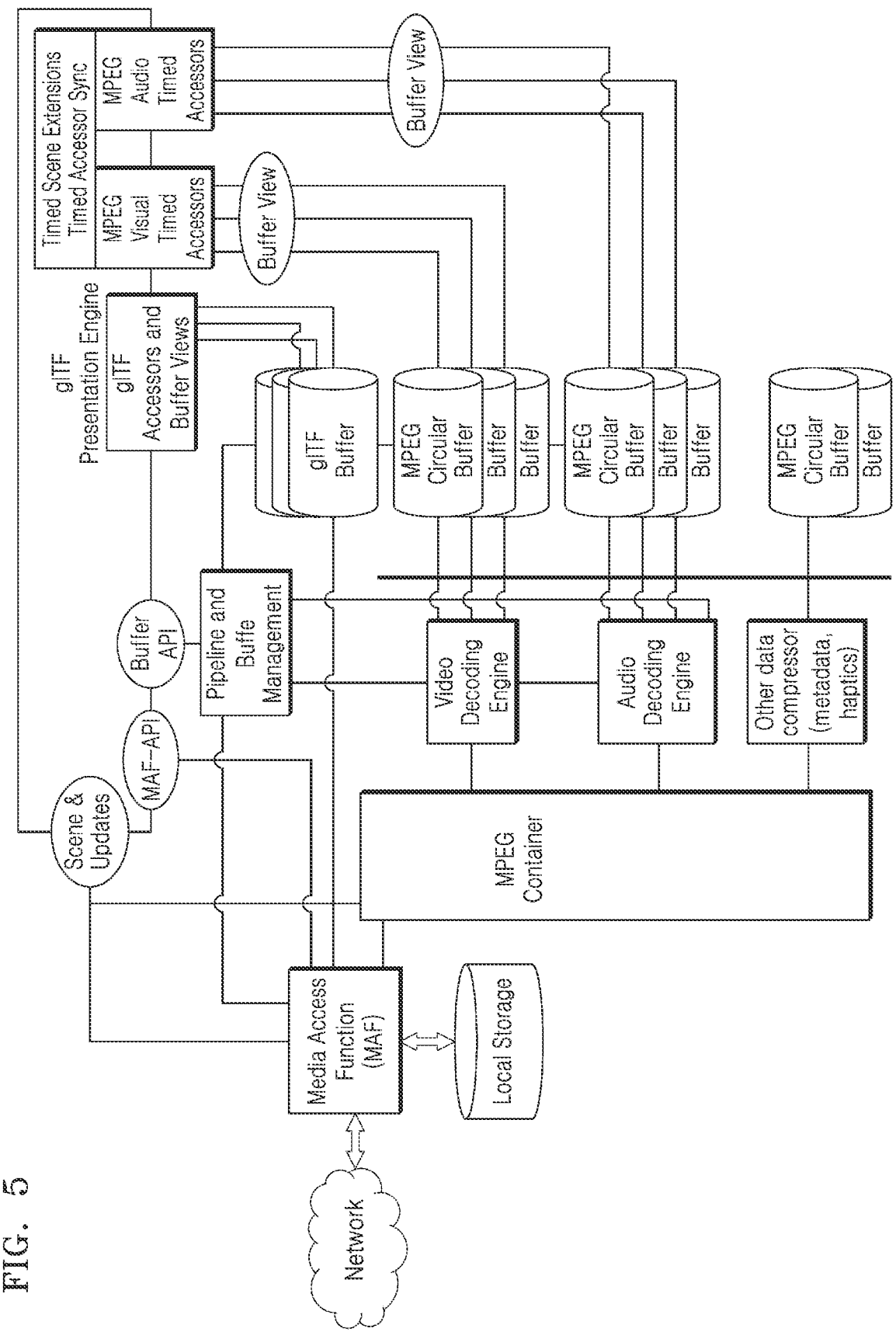
FIG. 5 is a diagram illustrating a typical architecture of entities inside an AR/MR media player that supports playback of media using an SD, according to an embodiment.

FIG. 1 is a flowchart illustrating a service procedure of a legacy video streaming service as taken from 3GPP TS26.501 5GMSA v16.6.1 FIG. 5.2-2.

The detailed procedures for the figure are also detail in 3GPP TS26.501 5GMSA v16.6.1 FIG. 5.2-2.

Typically, the steps related to the media service entry point:

5) On start media playback, the media application provides the URL of a manifest to the media player.

6) The media player establishes a transport session for the manifest at the URL specified in step 5.

7) The media player requests the manifest (a DASH media presentation description (MPD)) from the application service, using the URL specified in step 5, and through the transport session in step 6.

9) Once the media player receives the DASH MPD, it processes the MPD in order to select the necessary adaptation parameters and media data required for the service session (this includes identifying the locations of all possible adaptations of the media data, as well as selecting the relevant adaptation for streaming).

12) The media player then configures the playback pipeline according to the adaptation parameters and media specified from the MPD as selected in the processing of step 9.

Using the same procedure as in FIG. 1, it is possible to deliver since component AR object media data, by including such media data as an option inside the manifest requested and received by the media player in FIG. 1. However, the procedure does not support the streaming of multiple AR object media data, or the adaptation streaming of media data containing multiple media data components (including component level adaptation streaming).

Figure 2:
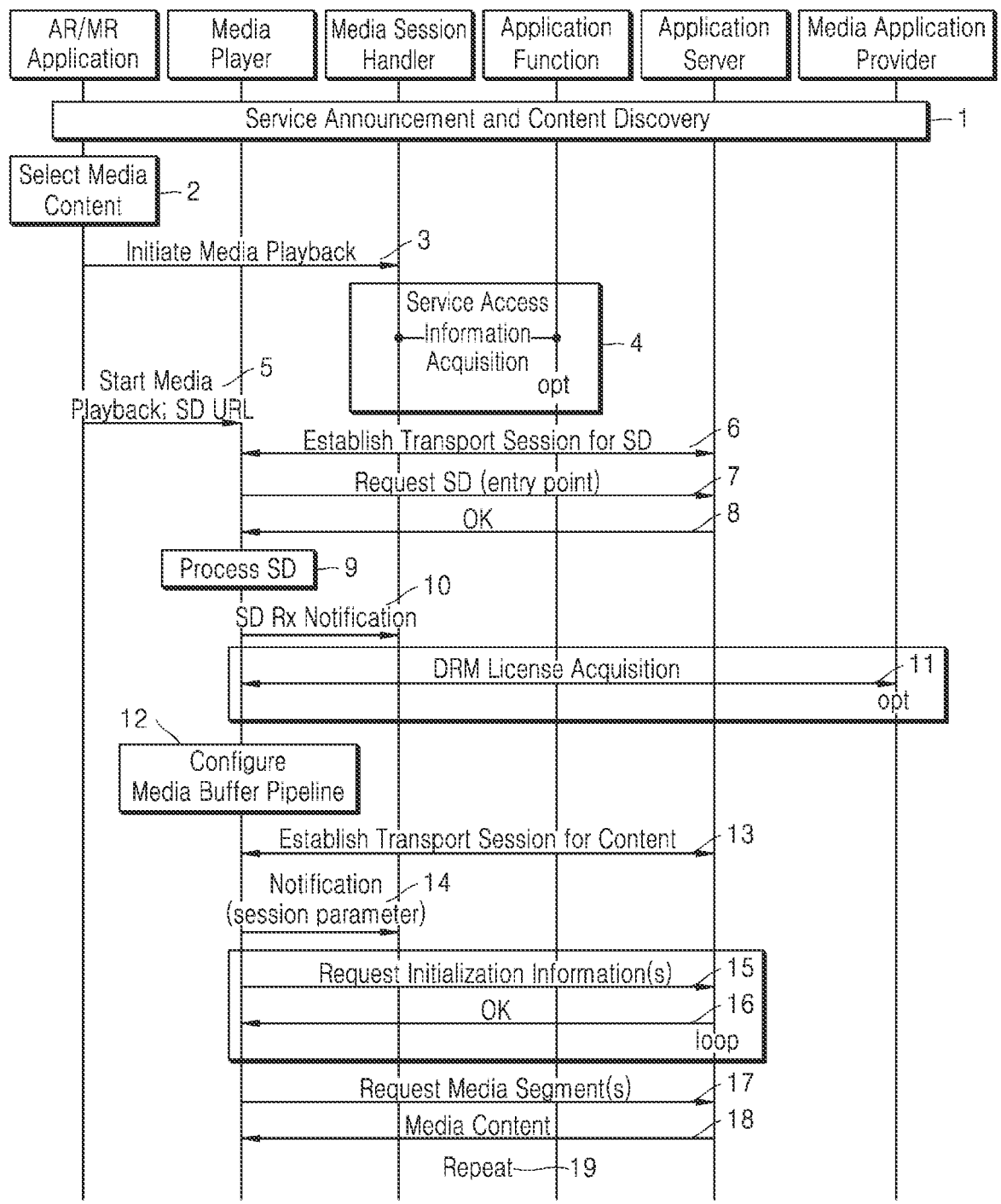
FIG. 2 is a flowchart illustrating a service procedure for a VR/AR/MR service with an SD as a service entry point, according to an embodiment.

FIG. 2 is a flowchart illustrating a service procedure for a VR/AR/MR service with an SD (e.g., glTF item, JSON document) as a service entry point, where the SD also directly contains possible adaptation information for the service media objects and/or pipelines, according to an embodiment.

Figure 4:
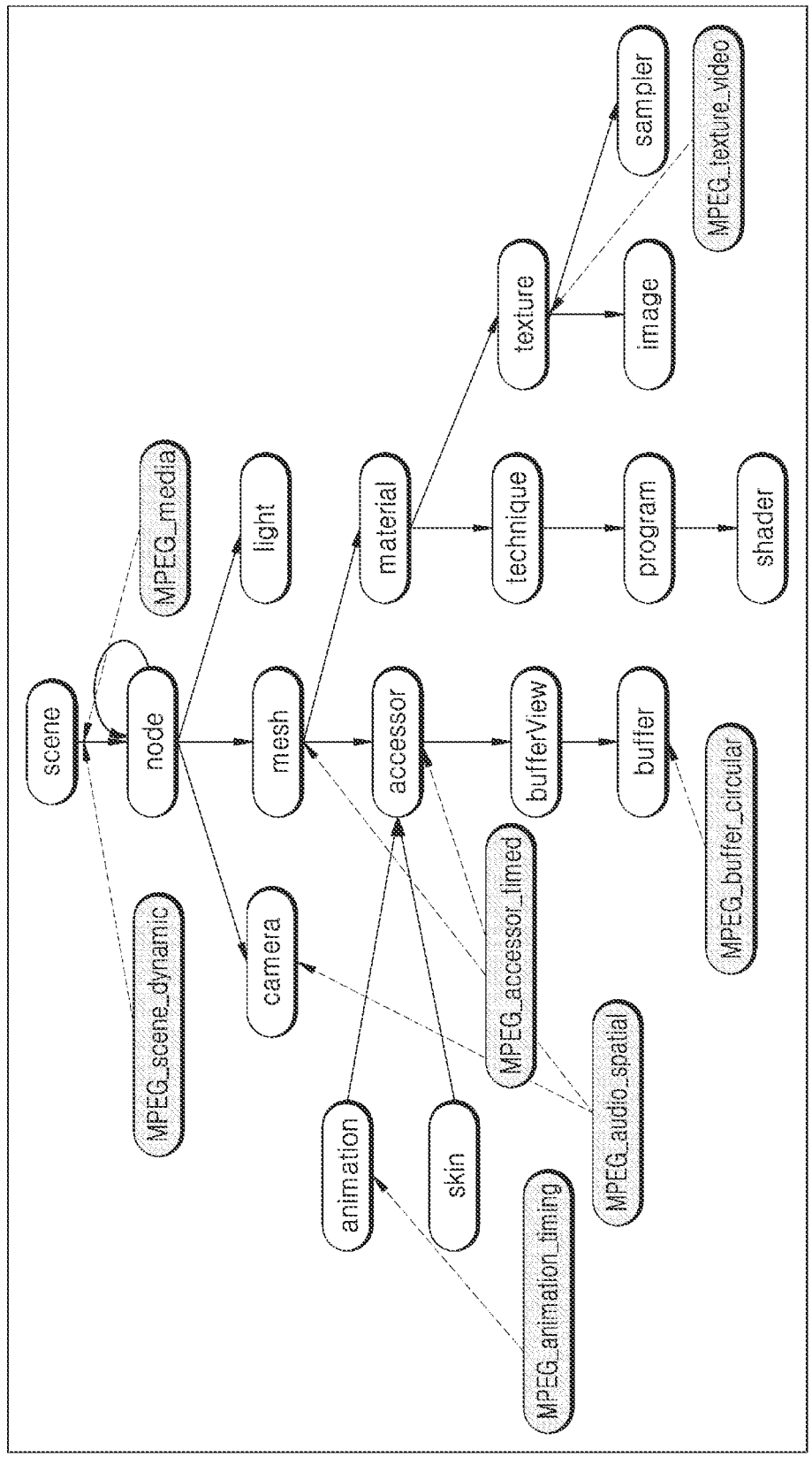
FIG. 4 is a diagram describing typical SD described by node representation.

Here, when compared to FIG. 1, the media application and media application provider are replaced by an AR/MR application and an AR/MR application provider respectively. Such naming is not limiting, and a media application/media application provider that supports VR/AR/MR services are also possible. Also, instead of a DASH MPD, the entry point uses a SD. A typical SD which can be used is a glTF files, or item, which is shown in FIG. 4. FIG. 4 describes typical SD described by node representation. This SD is a glTF item, with extension nodes supported MPEG media. This figure is based on ISO/IEC 23090-14 SD for MPEG Media.

Typically, the steps related to the media service entry point, which differ from those in FIG. 1:

5) On start media playback, the media application provides the URL of a SD to the media player. This URL points to the SD (glTF item).

6) The media player establishes a transport session for the SD at the URL specified in step 5.

7) The media player requests the SD (glTF item) from the application service, using the URL specified in step 5, and through the transport session in step 6.

9) Once the media player receives the SD (glTF item), it processes the SD in order to select the necessary media data, including adaptation parameters, required for the scene.

12) The media player then configures the multiple media buffer pipelines according to the media formats specified from the SD, and as selected by the media player from the processing of step 9.

Figure 6:
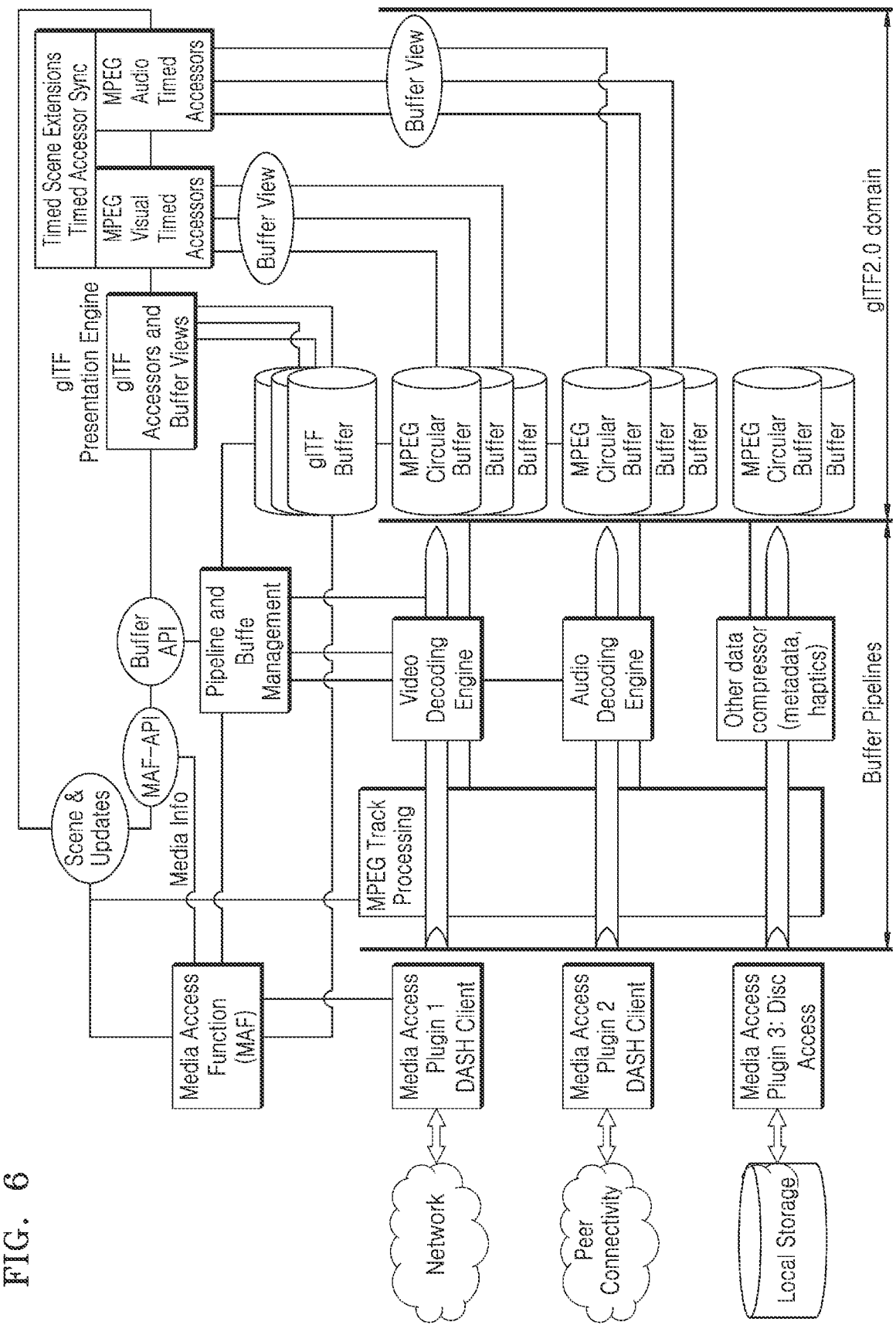
FIG. 6 is a diagram illustrating an architecture of entities inside an AR/MR media player that supports playback of media using an SD, according to an embodiment.

13) The media player may specify multiple transport sessions for content, for example a separate transport session for each media buffer pipeline as shown in FIG. 6. Certain transport sessions may also support multiplexed media data targeting multiple media pipelines, depending on the service.

Figure 3:
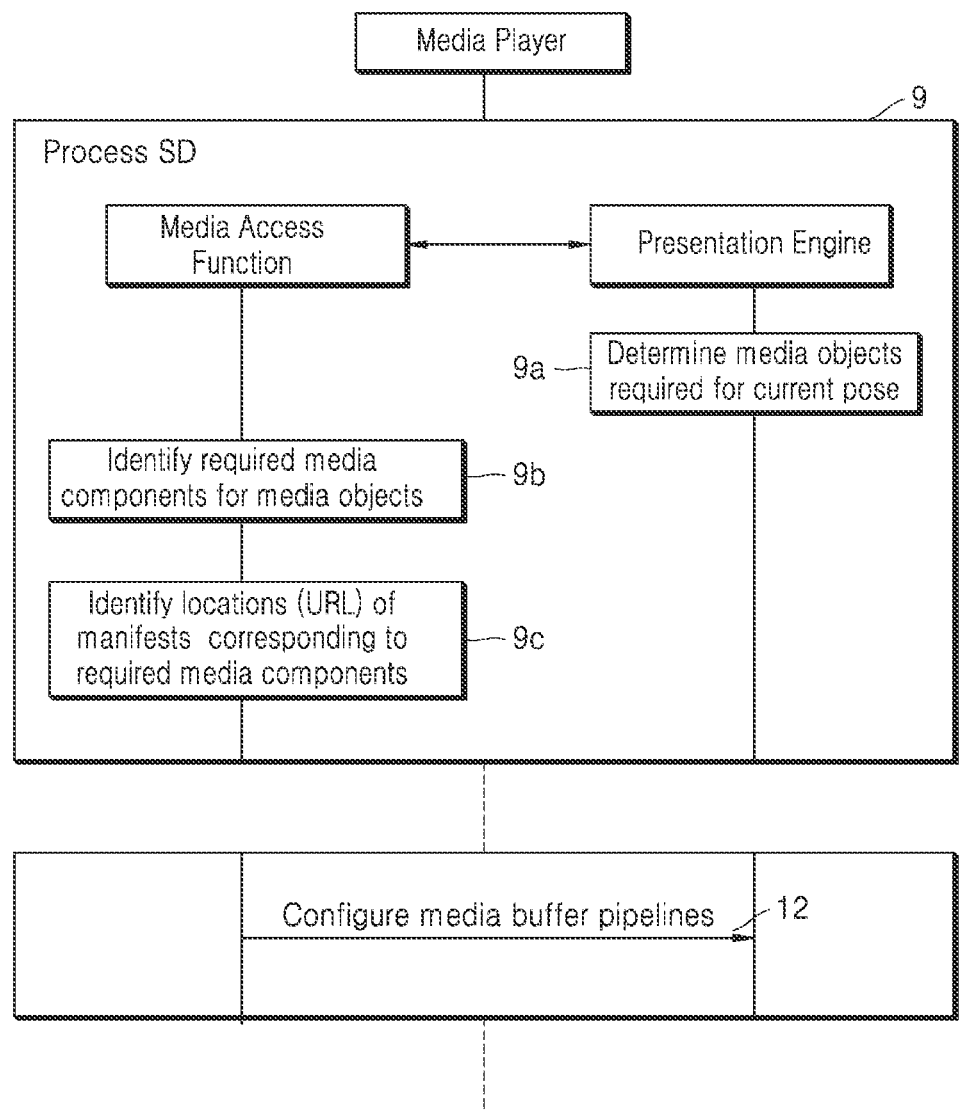
FIG. 3 is a diagram illustrating the "process SD" step shown in FIG. 2.

FIG. 3 is a diagram illustrating the "Process SD" step shown in FIG. 2.

A media player may be further defined into media access function and presentation engine components. In this embodiment, the procedures in processing the SD (glTF item) may be described as:

9a) The presentation engine determines which media objects are required for the composition of the scene, according to the composition information from the SD, and also the user's (or AR device's) pose and pose information (which includes its position and orientation, and may also taking into account the device's processing capabilities e.g. depth range, display range, etc.).

9b) For the media objects identified by the presentation engine in 9a, the media access function identifies which media formats and media components are required, according to the information in the SD.

9c) For each of the required media components as identified in 9b, identify and process the fetching data for each media component (this includes identifying the locations of all possible adaptations of the media component data, as well as selecting the relevant adaptation for streaming). This fetching data may exist in the form of manifests (such as DASH MPD) for each media component, or group of components.

Depending on the number of media components identified and required, the media access function configures the media buffer pipelines in the media player (between the media access function and the presentation engine) in step 12, as shown in FIG. 6.

FIG. 5 is a diagram illustrating a typical architecture of entities inside an AR/MR media player that supports playback of media using a SD, based on ISO/IEC 23090-14.

The glTF (SD) presentation engine renders the individual media from the corresponding media buffers, whilst the media access function establishes and configures the necessary media (buffer) pipelines that feed the corresponding media components into the presentation engine buffers.

A typical SD (glTF item) which also supports MPEG media (as in ISO/IEC 23090-14) contains information on the different media objects which are available, and also the different media components corresponding to the media objects (where applicable, depending on the media format used) which are available. It also essential composition information for the different media objects in the scene. Depending on the user pose, once the media player identifies the media objects required for creating and rendering the scene at the user pose, the media access function will configure the necessary pipelines for the media/media components, and link them to the corresponding media clients which fetch the actual media data (these may be multiple media clients depending on the media format of the media component which is being fetched).

FIG. 6 is a diagram illustrating an architecture of entities inside an AR/MR media player that supports playback of media using a SD. FIG. 6 shows the same architecture as FIG. 5, but highlighting the domes of the (media) buffer pipelines as described in this invention.

Figure 7:
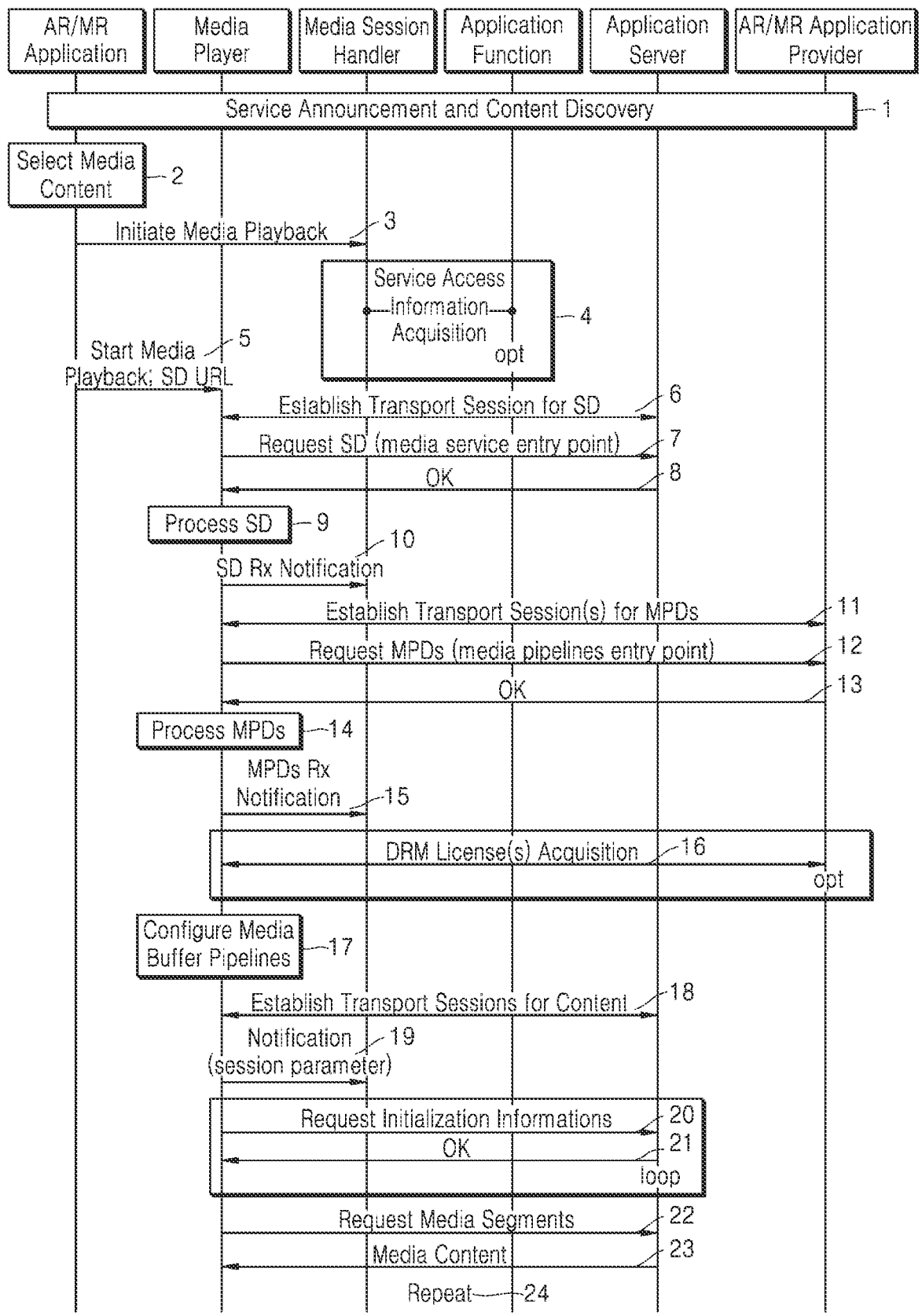
FIG. 7 is a flowchart illustrating a service procedure for a VR/AR/MR service with an SD as a service entry point, according to an embodiment.

FIG. 7 is a flowchart illustrating a service procedure for a VR/AR/MR service with an SD (e.g., glTF item, JSON document) as a service entry point, where the SD contains pointers (e.g., URLs) to subsequent manifests containing adaptation information supporting adaptation on different levels (e.g. media (buffer) pipelines, object level adaptation etc.), according to another embodiment of the disclosure.

Here, when compared to FIG. 2, the SD first received by the media player does not contain the fetching data required for fetching the actual media data (or media component data). As such, further procedures are necessary in order to fetch the manifests related to the required media (component) data (steps 11 to 14).

Typically, the steps related to the media service entry point in this embodiment:

5) On start media playback, the media application provides the URL of a SD to the media player. This URL points to the SD (glTF item).

6) The media player establishes a transport session for the SD at the URL specified in step 5.
7) The media player requests the SD (glTF item) from the application service, using the URL specified in step 5, and through the transport session in step 6.
9) Once the media player receives the SD (glTF item), it processes the SD in order to select the necessary media (component) data required for the scene.
11) The media player establishes one or more transport sessions for the delivery of manifests required for the selected media (component) data selected in step 9. Alternatively, the media player may request the manifests using the transport session established in step 6.
12) The media player requests the manifests for the media (component) data, using the corresponding information in the SD (such as URL of the manifests, which may be in the form of DASH MPD or similar).
14) Once the media player receives the manifests (e.g. DASH MPD), it processes the manifests in order to select the necessary adaptation parameters and media (component) data required for the service session.
17) The media player then configures the multiple media buffer pipelines according to the media formats specified from the SD, and as selected by the media player from the processing of step 9.
18) The media player may specify multiple transport sessions for content, for example a separate transport session for each media buffer pipeline as shown in FIG. 6. Certain transport sessions may also support multiplexed media data targeting multiple media pipelines, depending on the service.

Figure 8:
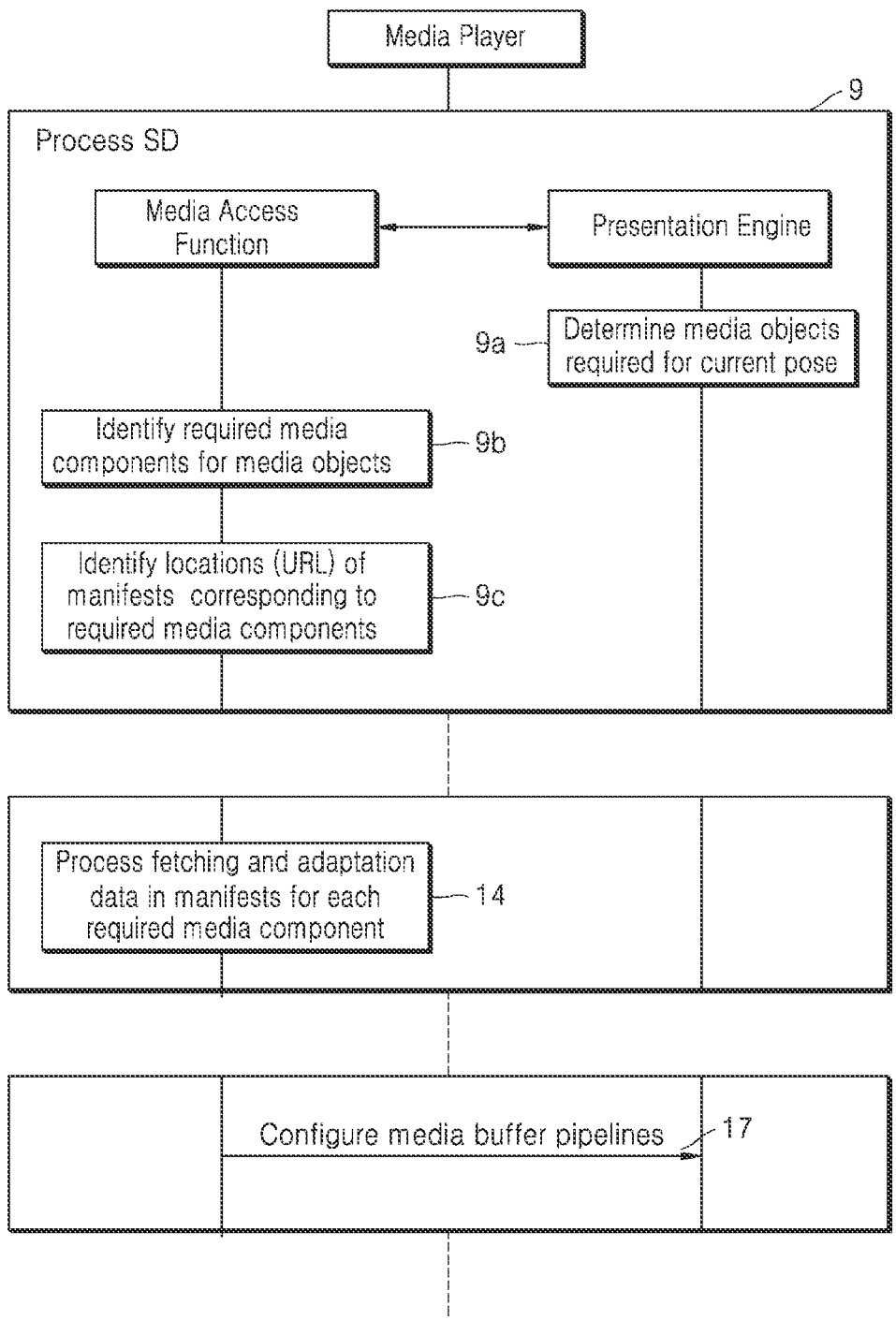
FIG. 8 is a diagram illustrating the "Process SD" step shown in the FIG. 7.

FIG. 8 is a diagram illustrating the "Process SD" step shown in FIG. 7. A media player may be further defined into media access function and presentation engine components. In this embodiment, the procedures in processing the SD (glTF item) may be described as: 9*a*) The presentation engine determines which media objects are required for the composition of the scene, according to the composition information from the SD, and also the user's (or AR device's) pose and pose information (which includes its position and orientation, and may also taking into account the device's processing capabilities, e.g., depth range, display range, etc.).

9*b*) For the media objects identified by the presentation engine in 9*a*, the media access function identifies which media formats and media components are required, according to the information in the SD.

9*c*) For each of the required media components as identified in 9*b*, identify and the locations (e.g., URLs) of the manifests which point to the location of the media components.

14) Once the manifests of the required media components are received, the media access function processes these manifests in order to select the necessary adaptation parameters and media (component) data required for the service session (this includes identifying the locations of all possible adaptations of the media component data, as well as selecting the relevant adaptation for streaming).

Depending on the number of media components identified and required, the media access function configures the media buffer pipelines in the media player (between the media access function and the presentation engine) in step 17, as shown in FIG. 6.

Figure 9:
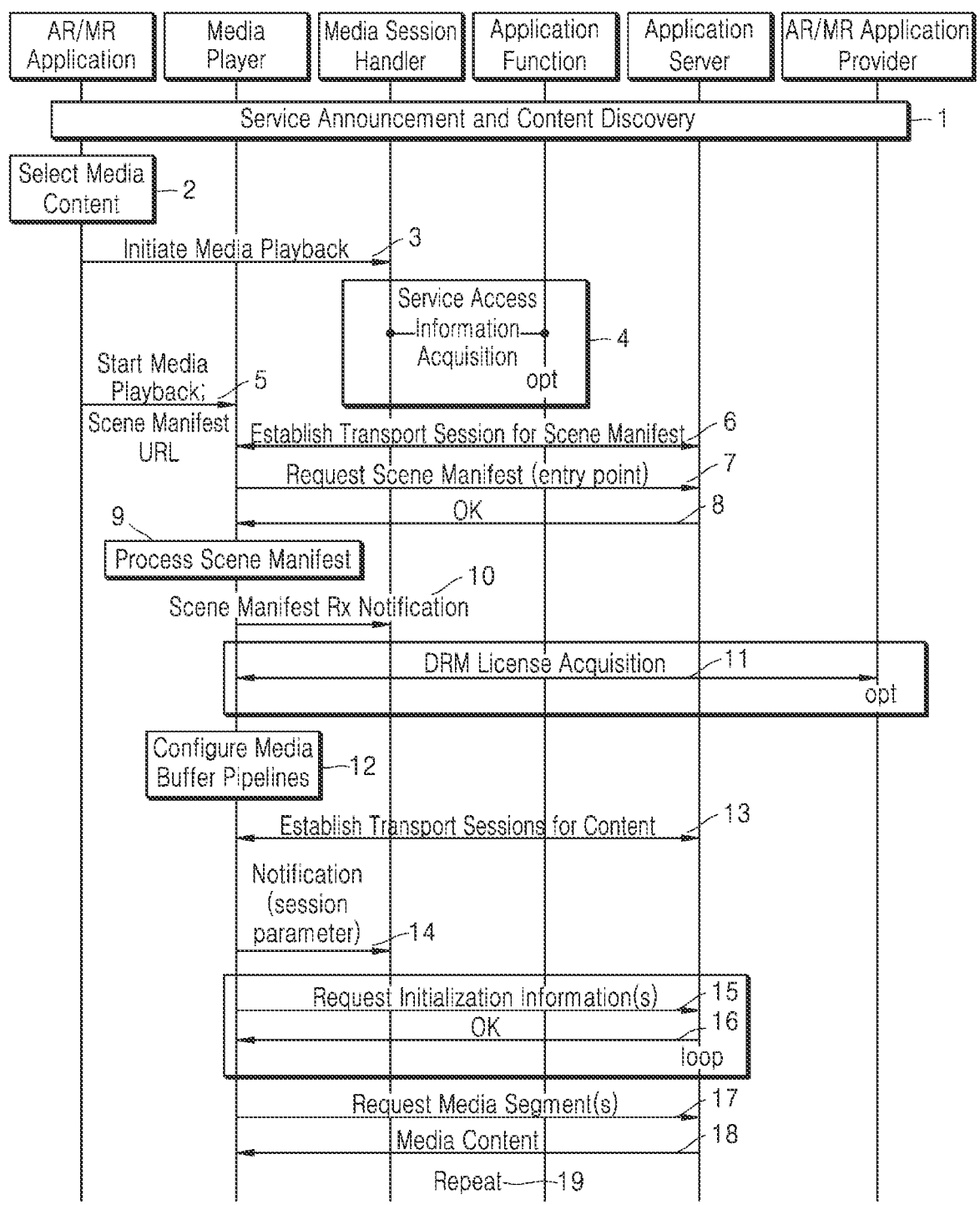
FIG. 9 is a flowchart illustrating a service procedure for a VR/AR/MR service with a scene manifest as a service entry point, according to an embodiment.

FIG. 9 is a flowchart illustrating a service procedure for a VR/AR/MR service with a scene manifest (which may contain multiple glTF items, as well as additional selection criteria metadata) as a service entry point, where the scene manifest contains SDs, and where the scene manifest or SDs contain possible adaptation information for directly fetching the service media objects and/or pipelines, according to another embodiment.

This scene manifest may also contain contextual information that may be used as selection criteria for the selection of media data or media components specified in the scene manifest.

Scene manifest context metadata for context based selection

This data inside the scene manifest may include:
The real world locations at which certain glTF item(s), or media data, can be fetched and displayed to the user (e.g. GPS coordinates or ranges).
E.g., a set of media data fetched for a user when s/he is in a room A, and a different set of media data fetched when s/he is in a different room B.
Restrictions on the locations at which certain glTF item (s), or media data, can be fetched and displayed to the user.
E.g., a set of media data which cannot be fetched and viewed when the user is in a certain location or environment/area.
A list of selectable sets of independent glTF items or media data, which can be fetched and displayed to the user at a certain real world location or locations.
E.g., The option for the user to select two or more sets of media data, each set corresponding to a separate experience, when s/he is in the same environment, such as a room.
Distance restrictions on the glTF items/media data which can be fetched and displayed to the user, based on the distance between the user and the object augmentation location (content registration location/surface).
E.g., at a close distance to the Eiffel Tower, media data can be fetched which correspond to adverts hang onto the tower, whilst at a far distance to the Eiffel Tower, different media data can be fetched which correspond to the flying objects which surrounding the Eiffel Tower.
Resource capability metadata which indicates the approximate resources necessary for fetching and rendering the glTF item(s) or media data.
E.g., one set of glTF item(s)/media data may target a low processing power/low battery consumption device (mode or setting), whilst another set of glTF item(s)/media data may target a high processing power device (mode or setting). These two sets of content may or may not contain the same media contents—if they contain the same contents, they may contain pointers (URLs) to different adaptations of the same content, such as differences in resolution, number of points, level of detail, textural detail, etc.

Typically, the steps related to the media service entry point in this embodiment:
5) On start media playback, the media application provides the URL of a scene manifest to the media player. This URL points to a scene manifest, which may contain multiple SDs (multiple glTF items), as well as corresponding context metadata related to the SDs and/or the media data inside the SDs.
6) The media player establishes a transport session for the scene manifest at the URL specified in step 5.
7) The media player requests the scene manifest from the application service, using the URL specified in step 5, and through the transport session in step 6.

9) Once the media player receives the scene manifest, it processes the scene manifest in order to select the necessary media data, taking into account the context metadata, and also including the adaptation parameters, required for the scene.

12) The media player then configures the multiple media buffer pipelines according to the SDs and media formats specified from the scene manifest, and as selected by the media player from the processing of step 9.

13) The media player may specify multiple transport sessions for content, for example a separate transport session for each media buffer pipeline as shown in FIG. 6. Certain transport sessions may also support multiplexed media data targeting multiple media pipelines, depending on the service.

Figure 10:
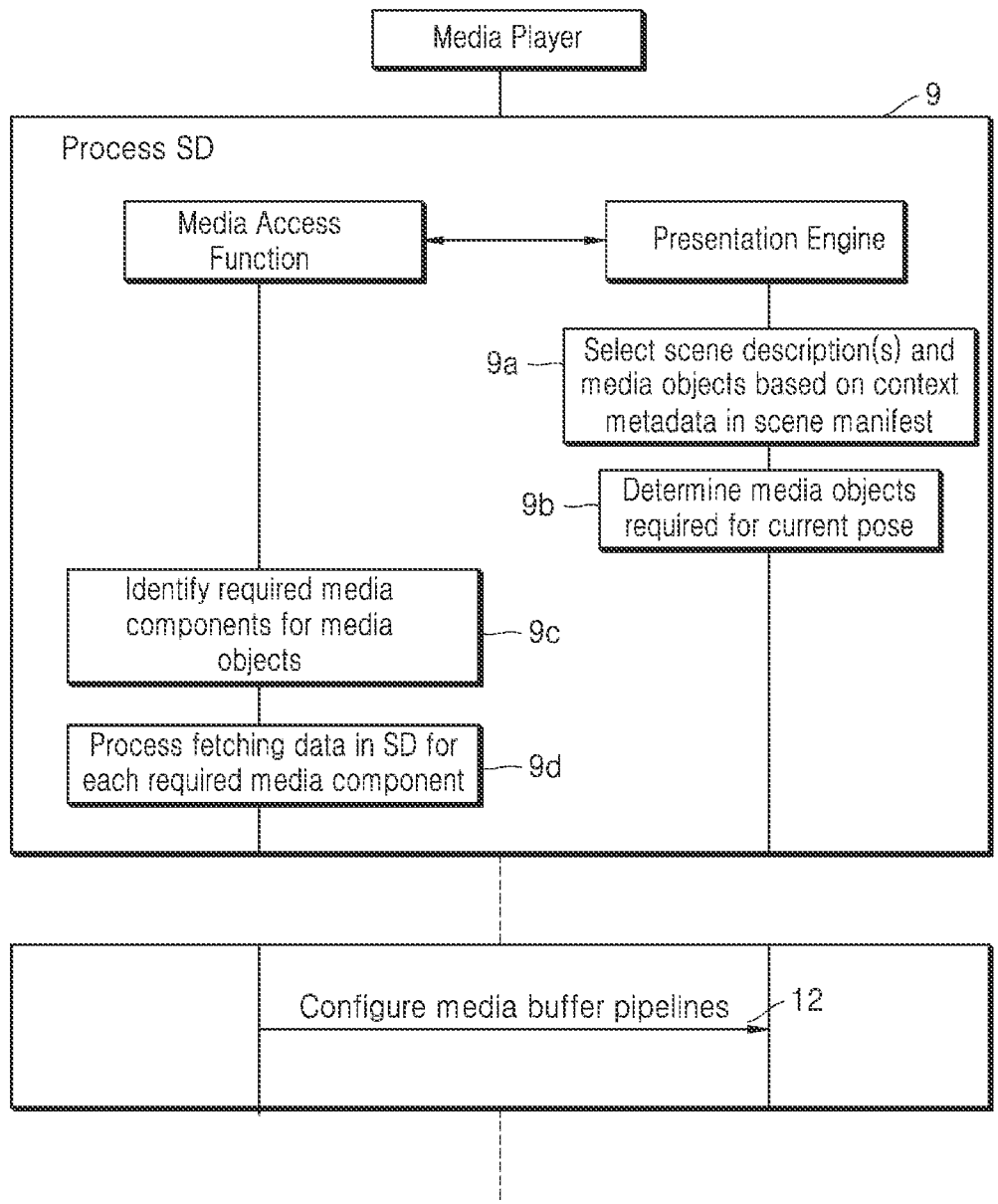
FIG. 10 is a diagram illustrating the "Process scene manifest" step shown in FIG. 9.

FIG. 10 is a diagram illustrating the "Process scene manifest" step shown in FIG. 9.

A media player may be further defined into media access function and presentation engine components. In this embodiment, the procedures in processing the scene manifest (which may contain multiple SDs (glTF items) as well as context metadata, and media objects) may be described as:

9*a*) The presentation engine selects the SD(s) (glTF item(s)) and/or media objects inside the scene manifest, based on the context metadata also carried inside the scene manifest. Some of these contexts for selection may also take into account the user device characteristics, such as device location, device distance from a certain location (e.g., augmentation location), device resource/processing capability, or other criteria (related to or not related to the scene manifest context metadata defined above).

9*b*) Once the SDs/media objects within the presentation manifest are selected in step 9*a*, the presentation engine determines which media objects are required for the composition of the scene, according to the composition information from the SD, and also the user's (or AR device's) pose and pose information (which includes its position and orientation, and may also taking into account the device's processing capabilities e.g. depth range, display range, etc.).

9*c*) For the media objects identified by the presentation engine in 9*b*, the media access function identifies which media formats and media components are required, according to the information in the SD(s)/scene manifest.

9*d*) For each of the required media components as identified in 9*b*, identify and process the fetching data for each media component (this includes identifying the locations of all possible adaptations of the media component data, as well as selecting the relevant adaptation for streaming). This fetching data may exist in the form of manifests (such as DASH MPD) for each media component, or group of components.

Depending on the number of media components identified and required, the media access function configures the media buffer pipelines in the media player (between the media access function and the presentation engine) in step 12, as shown in FIG. 6.

Figure 11:
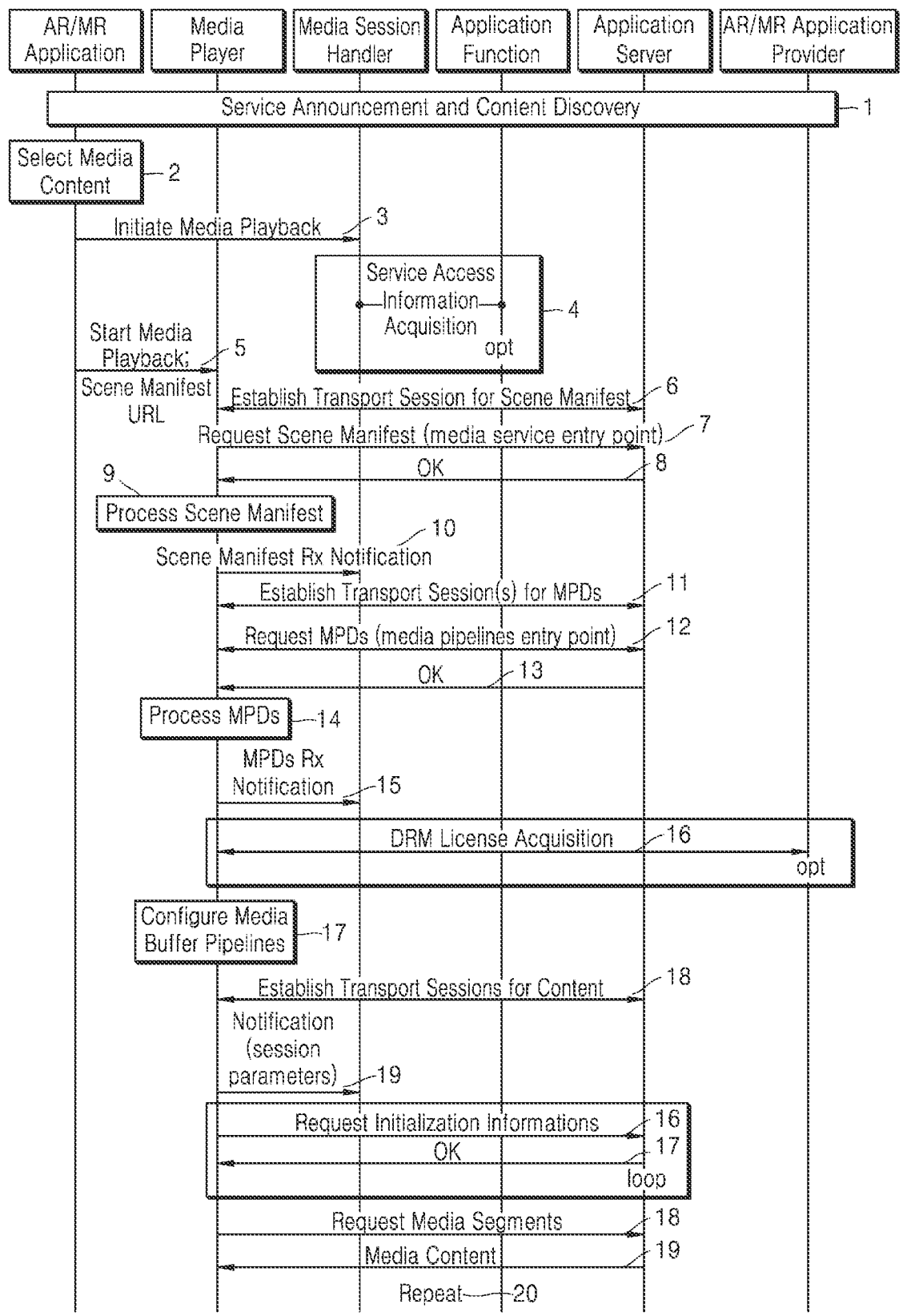
FIG. 11 is a flowchart illustrating a service procedure for a VR/AR/MR service with a scene manifest as a service entry point, according to an embodiment.

FIG. 11 is a flowchart illustrating a service procedure for a VR/AR/MR service with a scene manifest (which may contain multiple glTF items, as well as additional selection criteria metadata) as a service entry point, where the scene manifest contains SDs, and where the scene manifest or SDs contains only pointers (e.g., URLs) to subsequent manifests containing adaptation information supporting adaptation on different levels (e.g., media (buffer) pipelines, object level adaptation etc.), according to another embodiment.

This scene manifest may also contain contextual information metadata that may be used as selection criteria for the selection of media data or media components specified in the scene manifest, as described under the description of FIG. 9.

Here, when compared to FIG. 9, the scene manifest first received by the media player does not contain the fetching data (whether inside the scene manifest directly, or inside the SDs inside the scene manifest) required for fetching the actual media data (or media component data). As such, further procedures are necessary in order to fetch the manifests related to the required media (component) data (steps 11 to 14).

Typically, the steps related to the media service entry point in this embodiment:

5) On start media playback, the media application provides the URL of a scene manifest to the media player. This URL points to a scene manifest, which may contain multiple SDs (multiple glTF items), as well as corresponding context metadata related to the SDs and/or the media data inside the SDs.

6) The media player establishes a transport session for the scene manifest at the URL specified in step 5.

7) The media player requests the scene manifest from the application service, using the URL specified in step 5, and through the transport session in step 6.

9) Once the media player receives the scene manifest, it processes the scene manifest in order to select the necessary SD(s), and media data, taking into account the context metadata, required for the scene.

11) The media player establishes one or more transport sessions for the delivery of manifests required for the selected media (component) data selected in step 9. Alternatively, the media player may request the manifests using the transport session established in step 6.

12) The media player requests the manifests for the media (component) data, using the corresponding information in the SD (such as URL of the manifests, which may be in the form of DASH MPD or similar).

14) Once the media player receives the manifests (e.g. DASH MPD), it processes the manifests in order to select the necessary adaptation parameters and media (component) data required for the service session.

17) The media player then configures the multiple media buffer pipelines according to the media formats specified from the SD, and as selected by the media player from the processing of step 9.

18) The media player may specify multiple transport sessions for content, for example a separate transport session for each media buffer pipeline as shown in FIG. 6. Certain transport sessions may also support multiplexed media data targeting multiple media pipelines, depending on the service.

Figure 12:
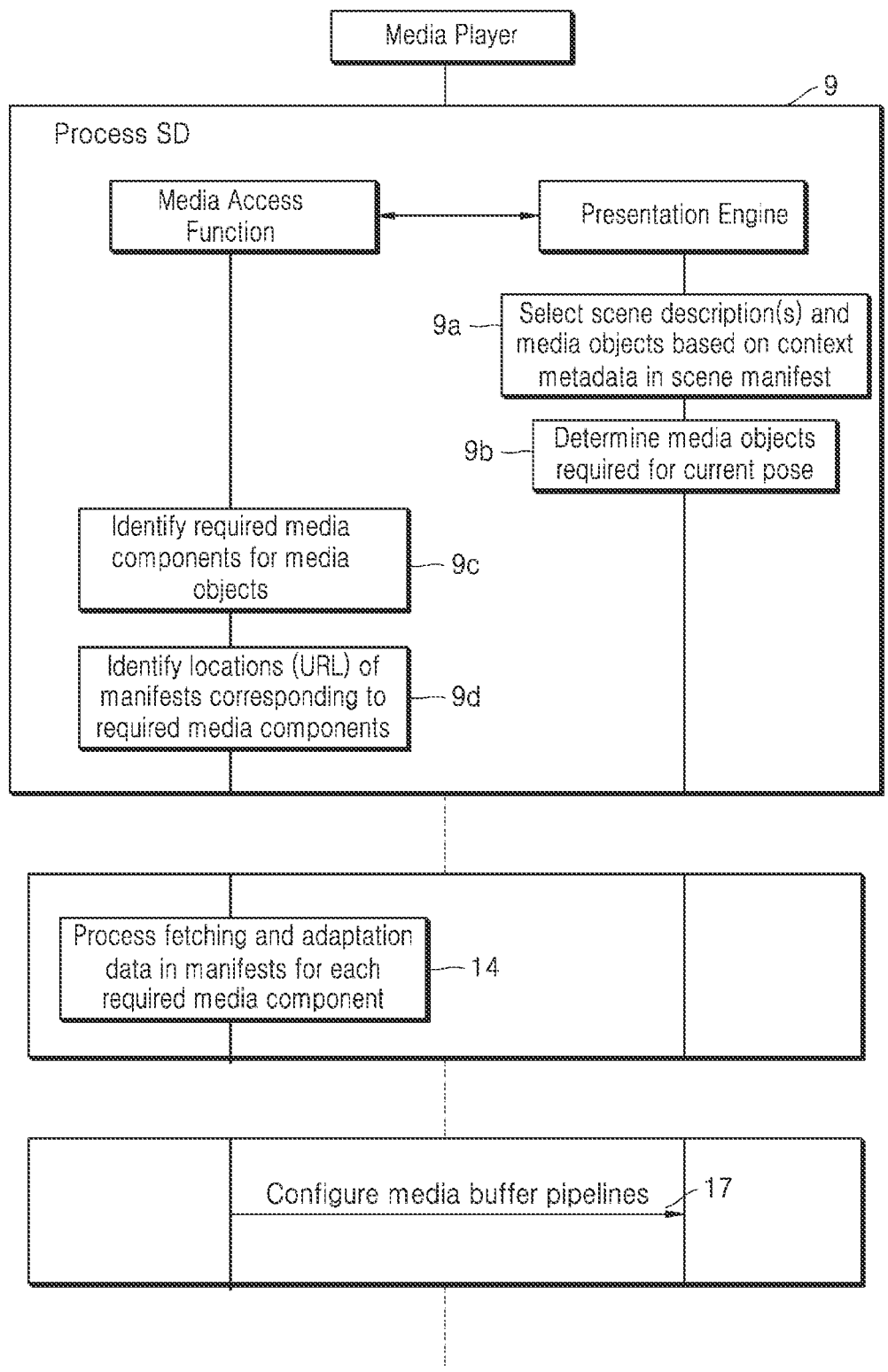
FIG. 12 is a diagram illustrating the "Process scene manifest" step shown in FIG. 11.

FIG. 12 is a diagram illustrating the "Process scene manifest" step shown in FIG. 11. A media player may be further defined into media access function and presentation engine components. In this embodiment, the procedures in processing the SD (glTF item) may be described as:

9*a*) The presentation engine selects the SD(s) (glTF item(s)) and/or media objects inside the scene manifest, based on the context metadata also carried inside the scene manifest. Some of these contexts for selection may also take into account the user device characteristics, such as device location, device distance from a certain location (e.g., augmentation location), device resource/processing capability, or other criteria (related to or not related to the scene manifest context metadata defined above).

9b) Once the SDs/media objects within the presentation manifest are selected in step 9a, the presentation engine determines which media objects are required for the composition of the scene, according to the composition information from the SD, and also the user's (or AR device's) pose and pose information (which includes its position and orientation, and may also taking into account the device's processing capabilities, e.g., depth range, display range, etc.).

9c) For the media objects identified by the presentation engine in 9b, the media access function identifies which media formats and media components are required, according to the information in the SD(s)/scene manifest.

9d) For each of the required media components as identified in 9b, identify and the locations (e.g., URLs) of the manifests which point to the location of the media components.

14) Once the manifests of the required media components are received, the media access function processes these manifests in order to select the necessary adaptation parameters and media (component) data required for the service session (this includes identifying the locations of all possible adaptations of the media component data, as well as selecting the relevant adaptation for streaming).

Depending on the number of media components identified and required, the media access function configures the media buffer pipelines in the media player (between the media access function and the presentation engine) in step 17, as shown in FIG. 6.

Throughout this disclosure, media buffer pipelines may carry:
  Media data, such as video, audio, 3D meshes, etc.
  Media data components, such as compression point cloud components (geometry, texture, patch info, occupancy)
  Metadata (either media related or not)
  Any other relevant data with or without time dependency
  FIG. 13 is a block diagram of an entity, according to an embodiment.

Figure 13:
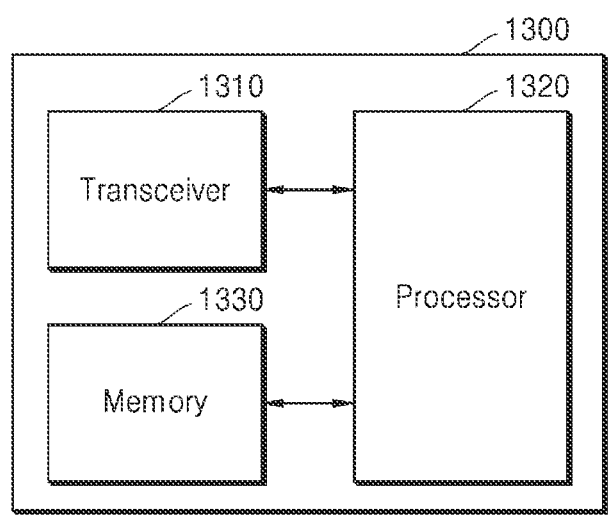
FIG. 13 is a block diagram of an entity, according to an embodiment.

The entity 1300 of FIG. 13 may performs aforementioned operations of one of AR/MR application, media player, media session handler, application function, application server and AR/MR application provider.

Referring to FIG. 13, the entity 1300 may include a transceiver 1310, a processor 1320 and a memory 1330. Elements of the entity 1300 are not, however, limited thereto. For example, the entity 1300 may include more (e.g., a memory) or fewer elements than described above The transceiver 1310 may transmit or receive signals to or from another entity. The signal may include SD and media segment. In addition, the transceiver 1310 may receive a signal on a wired channel or wireless channel and output the signal to the processor 1320, or transmit a signal output from the processor 1320 on a wired channel or wireless channel.

The processor 1320 may control a series of processes for the entity 1300 to operate in accordance with the embodiments of the disclosure. The processor 1320 may include a controller or one or more processors.

A memory 1330 may store a program and data required for operation of the entity 1300. Furthermore, the memory 1330 may store the SD and the media segment included in the signal obtained by the entity 1300. The memory 1330 may include a storage medium such as a read only memory (ROM), a random access memory (RAM), a hard disk, a compact disc ROM (CD-ROM), and a digital versatile disc (DVD), or a combination of storage mediums.

According to an embodiment, providing streaming VR/AR/MR media service including following features is enabled:
  Support of volumetric media;
  Support of SD;
  Support of VR/AR/MR media selection, including multiple selection criteria based on different contexts; and
  Support of media adaptation on different levels, including SD, volumetric media objects, media (component) pipelines, media buffer pipelines.

Methods according to the claims of the disclosure or the various embodiments of the disclosure described in the specification may be implemented in hardware, software, or a combination of hardware and software.

When implemented in software, a computer-readable storage medium storing one or more programs (software modules) may be provided. One or more programs stored in the computer-readable storage medium are configured for execution by one or more processors in an electronic device. The one or more programs may include instructions that cause the electronic device to perform the methods in accordance with the claims of the disclosure or the various embodiments of the disclosure described in the specification.

The programs (software modules, software) may be stored in a RAM, a non-volatile memory including a flash memory, a ROM, an electrically erasable programmable ROM (EEPROM), a magnetic disc storage device, a CD-ROM, a DVD, or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a local area network (LAN), a wide area network (WAN), a storage area network (SAN), or a combination thereof. The storage device may be connected to an apparatus performing the various embodiments of the disclosure through an external port. In addition, a separate storage device in the communication network may be connected to the apparatus performing the various embodiments of the disclosure.

In the various embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of providing media service, performed by an entity, the method comprising:
  obtaining a uniform resource locator (URL) of a scene description (SD);
  establishing a first transport session for the SD;
  receiving, from a server through the first transport session for the SD, the SD based on the URL of the SD;

processing the SD for at least one media component required for a scene;
establishing a second transport session for delivery of a manifest required for the at least one media component;
receiving the manifest through the second transport session for the delivery of the manifest;
processing the manifest for the at least one media component required for a service session;
configuring at least one media buffer pipeline for the at least one media component based on the processed manifest; and
establishing at least one third transport session for the at least one media component.

2. The method of claim 1, further comprising:
receiving the at least one media component through the at least one third transport session for the at least one media component.

3. A method of providing media service, performed by a server, the method comprising:
receiving, from an entity, a request for a scene description (SD) based on uniform resource locator (URL) of the SD; and
transmitting, to the entity through a first transport session for the SD, the SD based on the request,
wherein the first transport session for the SD is established at the entity,
wherein the SD is processed for at least one media component required for a scene,
wherein a second transport session for delivery of a manifest required for the at least one media component is established at the entity,
wherein the manifest is transmitted to the entity through the second transport session for the delivery of the manifest,
wherein the manifest is processed for the at least one media component required for a service session,
wherein at least one media buffer pipeline is configured for the at least one media component based on the processed manifest, and
wherein at least one third transport session for the at least one media component is established.

4. The method of claim 3, wherein the at least one media component is transmitted to the entity through the at least one third transport session for the at least one media component.

5. An entity providing a media service, the entity comprising:
a transceiver; and
a processor coupled with the transceiver and configured to:
obtain a uniform resource locator (URL) of a scene description (SD),
establish a first transport session for the SD,
receive, from a server through the first transport session for the SD, the SD based on the URL of the SD,
process the SD for at least one media component required for a scene,
establish a second transport session for delivery of a manifest required for the at least one media component,
receive the manifest through the second transport session for the delivery of the manifest,
process the manifest for the at least one media component required for a service session,
configure at least one media buffer pipeline for the at least one media component based on the processed manifest, and
establish at least third transport session for the at least one media component.

6. The entity of claim 5, wherein the processor is further configured to receive the at least one media component via the second transport session for the at least one media component.

7. A server providing a media service, the server comprising:
a transceiver; and
a processor coupled with the transceiver and configured to:
receive, from an entity, a request for a scene description (SD) based on uniform resource locator (URL) of the SD; and
transmit, to the entity through a first transport session for the SD, the SD based on the request,
wherein the first transport session for the SD is established at the entity,
wherein the SD is processed for at least one media component required for a scene,
wherein a second transport session for delivery of a manifest required for the at least one media component is established at the entity,
wherein the manifest is transmitted to the entity through the second transport session for the delivery of the manifest,
wherein the manifest is processed for the at least one media component required for a service session,
wherein at least one media buffer pipeline is configured for the at least one media component based on the processed manifest, and
wherein at least one third transport session for the at least one media component is established.

8. The server of claim 7, wherein the at least one media component is transmitted to the entity through the at least one third transport session for the at least one media component.

* * * * *